April 14, 1970  E. P. MOSLO  3,505,708
FLUID POWER ACTUATED CLAMP FOR MOLDING APPARATUS
Filed Jan. 30, 1967  4 Sheets-Sheet 1

INVENTOR.
ERNEST P. MOSLO
BY
Baldwin, Doran & Egan
ATTORNEYS

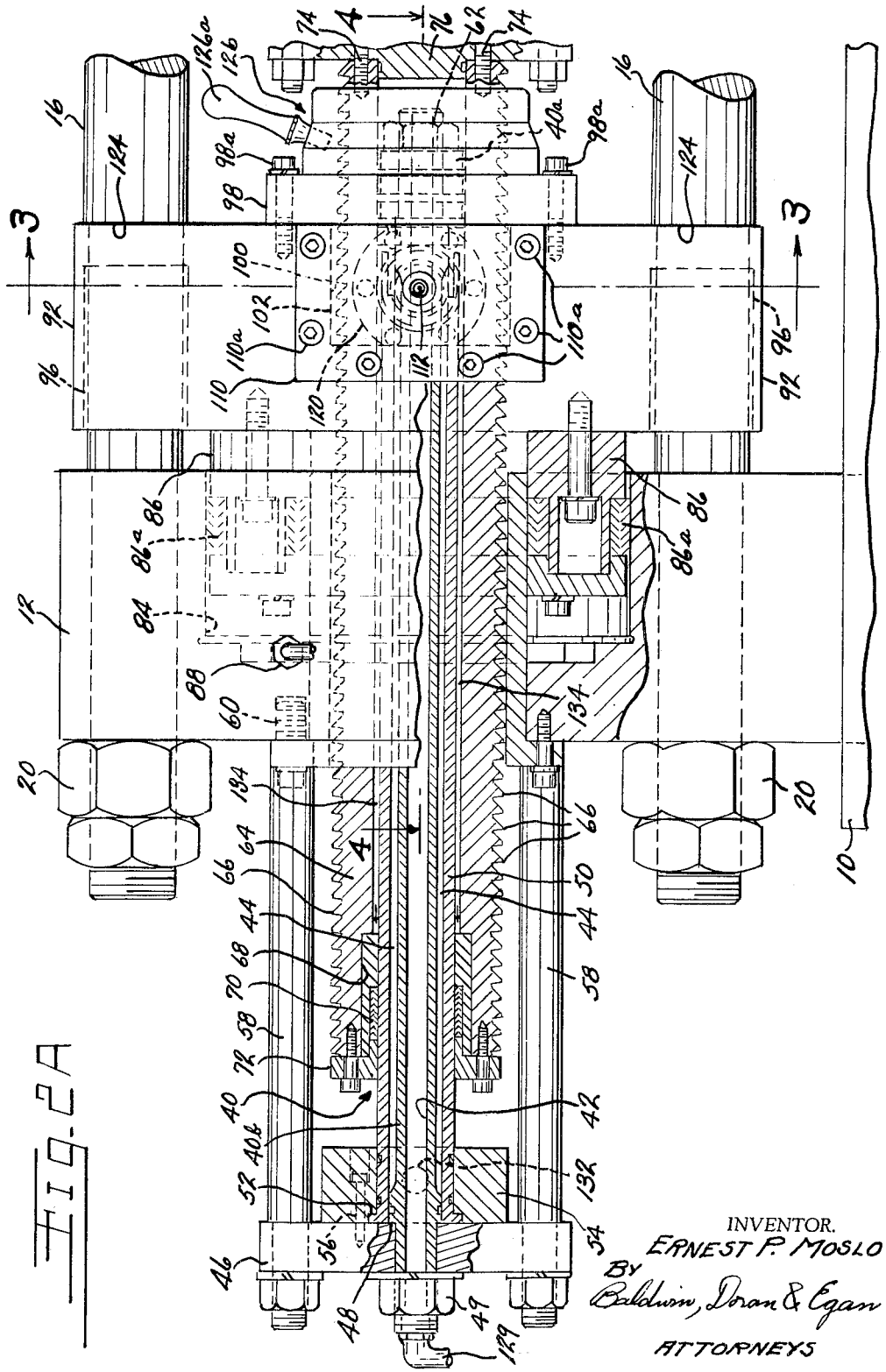

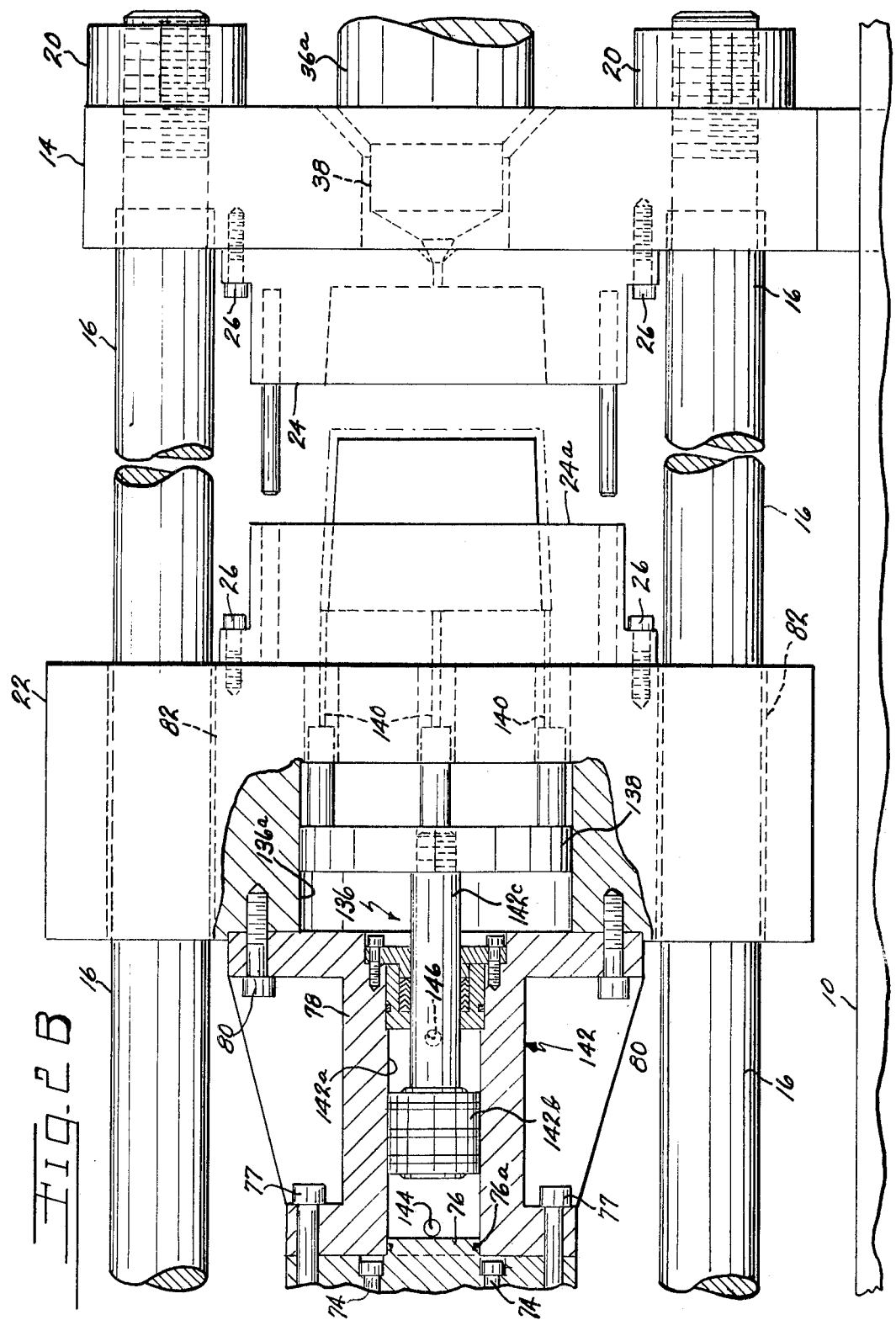

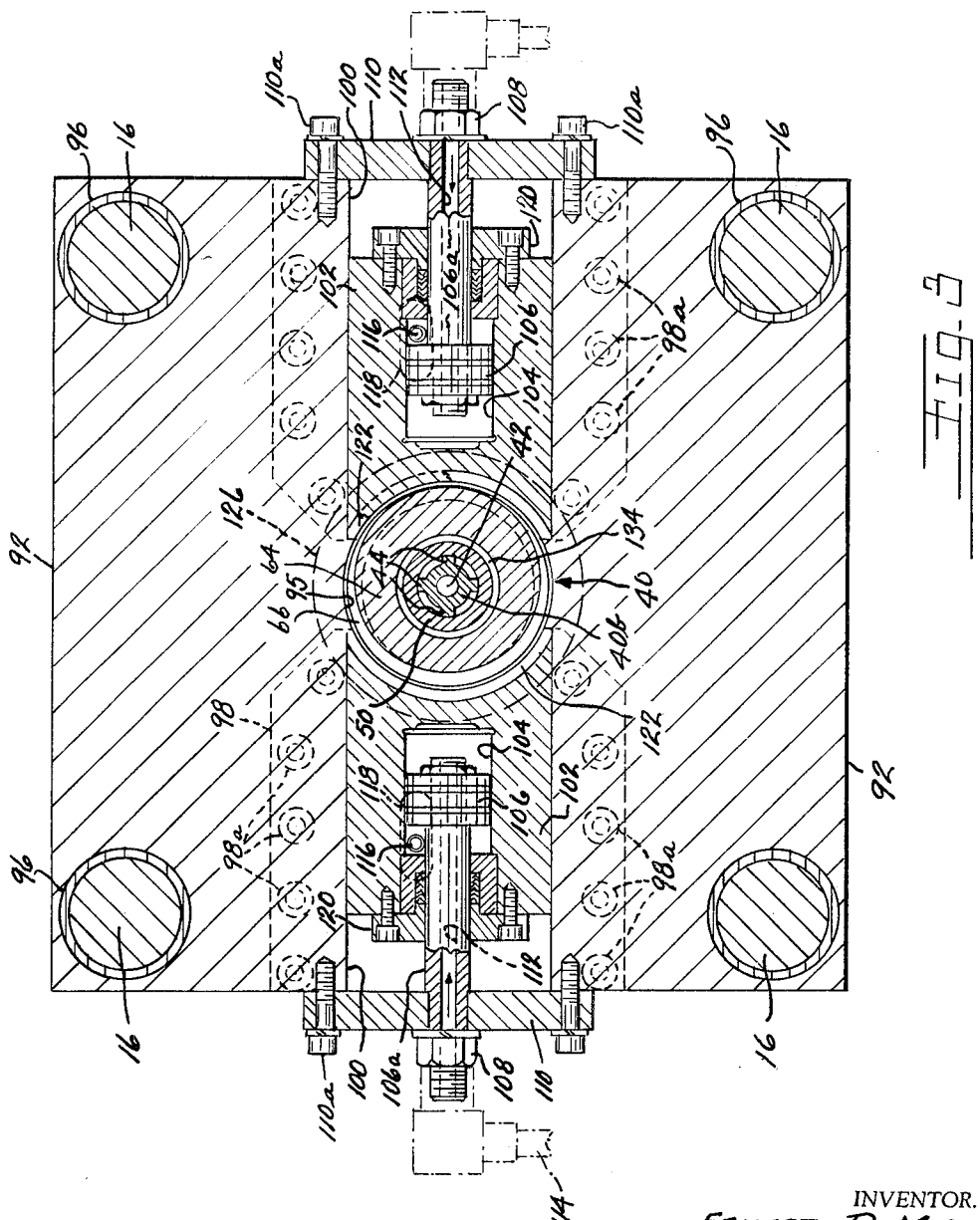

United States Patent Office 3,505,708
Patented Apr. 14, 1970

3,505,708
FLUID POWER ACTUATED CLAMP FOR
MOLDING APPARATUS
Ernest P. Moslo, 12700 Lake Ave.,
Cleveland, Ohio 44107
Filed Jan. 30, 1967, Ser. No. 612,438
Int. Cl. B29c *1/16*
U.S. Cl. 18—43                                    19 Claims

ABSTRACT OF THE DISCLOSURE

A molding machine for plastics comprising a primary motor unit having a threaded exterior configuration and coupled to the movable platen, for closing and opening the molds, and a secondary motor unit for applying high pressure closing force to the molds, with clamping jaws coupled to the secondary motor unit for clamping the latter to the threaded primary motor unit to apply the force of the secondary motor unit to the platen, and an adjustable threaded nut mounted on the primary motor unit for aligning the clamping jaws with the threads on the primary motor unit.

---

This invention relates to improvements in molding machines and more particularly plastic injection molding machines.

Molding machines having means for providing an initial primary closing operation on the mold members, and secondary means for obtaining relatively high pressure secondary closing of the mold members after actuation of the primary means are known in the art.

The present invention provides a novel molding machine which includes a fluid powered primary motor unit having relatively small piston for relatively long range of travel for the initial primary closing operation of the mold, and a fluid powered secondary motor unit having a relatively larger piston for cooperation with the primary motor unit, and having a relatively short stroke, under which fluid is applied at relatively high pressure, for obtaining a secondary closing of the mold members after the completion of the primary or initial closing, together with novel clamping means for expeditiously coupling the secondary motor unit to the primary motor unit. Such clamping mechanism enables a high strength coupling to be accomplished between the primary and secondary motor units so that the latter in effect operates as an integral mechanism to accomplish high pressure clamping of the platens of the molding machine, thus effectively holding the mold sections in positive closed relation.

Accordingly, an object of the invention is to provide an improved arrangement of molding machine.

Another object of the invention is to provide an improved arrangement of plastic molding machine including primary actuating means for initial closing operations on the mold, and secondary actuating means adapted for cooperation with the primary actuating means for obtaining a secondary high pressure closure of the mold, and wherein adjustable clamping means is provided for effective coupling of the high pressure secondary actuating means to the primary relatively low pressure actuating means.

A still further object of the invention is to provide a molding machine of the latter described type wherein the primary actuating means includes a reciprocal type piston and cylinder unit having exterior serrated means thereon and wherein the secondary actuating means has clamping means mounted thereon adapted for interlocking coaction with the serrated means on the primary actuating means for coupling the primary and secondary means together as a unit, and wherein means is provided for adjustably aligning the clamping means on the secondary actuating means with the serrated means on the primary actuating means, so that effective locking action between the primary and secondary actuating means can occur for providing high pressure force to the mold.

A still further object of the invention is to provide a novel injection type molding machine including primary actuating means comprising a relatively small double acting reciprocal type piston and cylinder motor unit for providing relatively long range of travel for the initial primary closing operation on the mold, and secondary actuating means including a relatively large reciprocal type piston and cylinder motor unit adapted for cooperation with the primary actuating means, and with such secondary motor unit having a relatively short stroke under which fluid is applied at relatively high pressure for obtaining a secondary high pressure closing of the mold after the completion of the initial primary closing, for effectively clamping the mold member together, and wherein the cylinder of the primary actuating means includes an exterior helical thread configuration and wherein the secondary actuating means includes jaw means thereon having a threaded configuration formed complementary to the threaded configuration of the cylinder of the primary actuating means, and adapted for interlocking clamping coaction therewith, for effectively coupling the secondary actuating means to the cylinder of the primary actuating means, and including threaded nut means for effectively adjusting the position of the clamping jaws with respect to the threads on the cylinder of the primary actuating means, so that upon closing of the jaws, the threads on the cylinder and on the jaws will accurately mate with one another for effective and expeditious coupling of the secondary actuating means to the primary actuator.

Other objects and advantages of the invention will be apparent from the following description taken in conjunction with the accompanying drawing wherein:

FIGURE 1 is a reduced size, side elevational view of an injection type molding machine embodying the invention;

FIGURES 2A and 2B are an enlarged partially sectional elevational view of a portion of the machine of FIGURE 1 and showing particularly the primary and secondary actuating means for accomplishing closure and opening of the mold sections, and the adjustable nut means for adjusting the position of the clamping jaws on the secondary actuating means with respect to the exteriorly threaded cylinder of the primary actuating means;

FIGURE 3 is a sectional view taken generally along the plane of line 3—3 of FIG. 2A and illustrating in particular the clamping jaw means on the secondary actuating means which cooperate with the threaded means on the primary actuating means, for clamping the secondary actuating means to the primary actuating means;

Figure 1:
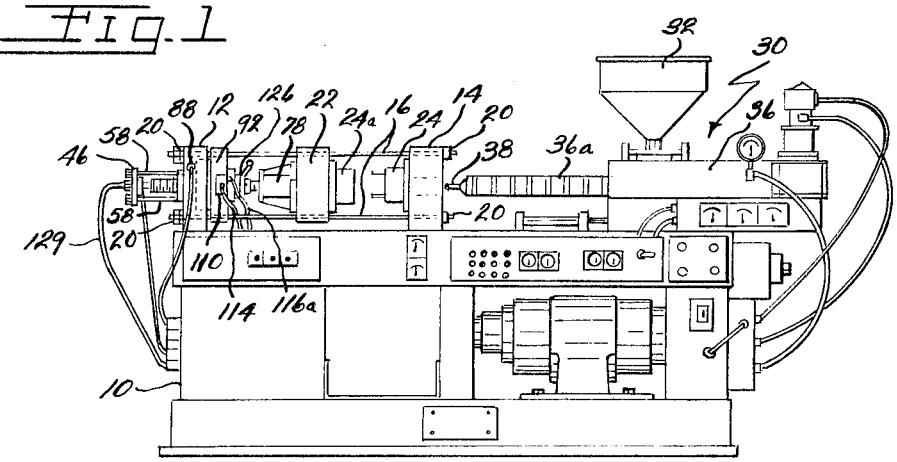

Referring now again to the drawings and particularly of FIGURE 1 thereof, reference No. 10 designates a base which may be for instance of cast or welded construction, and which may be hollow for housing such mechanism as is necessary to operate the molding machine.

The base 10 may have a first support 12 rigidly mounted thereon adjacent one end thereof, and a second support 14 in the form of a stationary platen may be rigidly mounted on base 10 in spaced relation to support 12. The bars or rails 16 of cylindrical configuration, in the embodiment illustrated, extend between supports 12 and 14 and may be secured thereto as by means of threaded nuts 20. Tie bars 16 provide ways on which is mounted a movable platen 22, which is adapted for movement toward and away from the stationary platen 20. Mold sections 24, 24a may be secured as by means of fasteners 26 (FIG. 2B) to respectively the stationary platen 14 and the movable platen 22, and are adapted for mating relation upon closure of the mold sections, to provide a mold cavity for receiving moldable material therein.

Mounted adjacent the other end of base 10 there may be plastic injection mechanism 30 which may be of any suitable type and which in the embodiment illustrated includes hopper 32 adapted to receive therein solid plastic material preferably in finely divided, granular-like form for feeding into injection means 36, such as for instance a screw or ram injector, for injecting the plastic material into the closed mold. Injector means 36 includes plasticizing mechanism 36a, such as heating coils or the like, for plasticizing the stock material prior to egress thereof from nozzle 38.

The primary actuating means for moving platen 22 may comprise a fluid powered motor unit 40 (FIG. 2A). Such motor unit may comprise a piston 40a and attached piston rod 40b (FIG. 4) which is of generally hollow construction, with a passageway 42 extending for the full length of the piston rod, and with the exterior of the piston rod being of generally splined or slotted construction as at 44 (FIG. 3) in a direction axially thereof. Rod 40b may be anchored adjacent one end thereof to support plate 46, and as by means of shoulder portion 48 and associated nut 49.

Encircling the rod 40b in enclosing relationship therewith is a sleeve member 50 (FIGS. 2A and 3) which is of hollow, generally cylindrical construction, and which may be anchored as at 52 to manifold member 54 which in turn is secured as by means of bolts 56 to aforementioned support plate 46 mounted on or secured to tie bars 58 on the machine. The other end of tie bars 58 may be anchored as at 60 to support 12.

Figure 4:
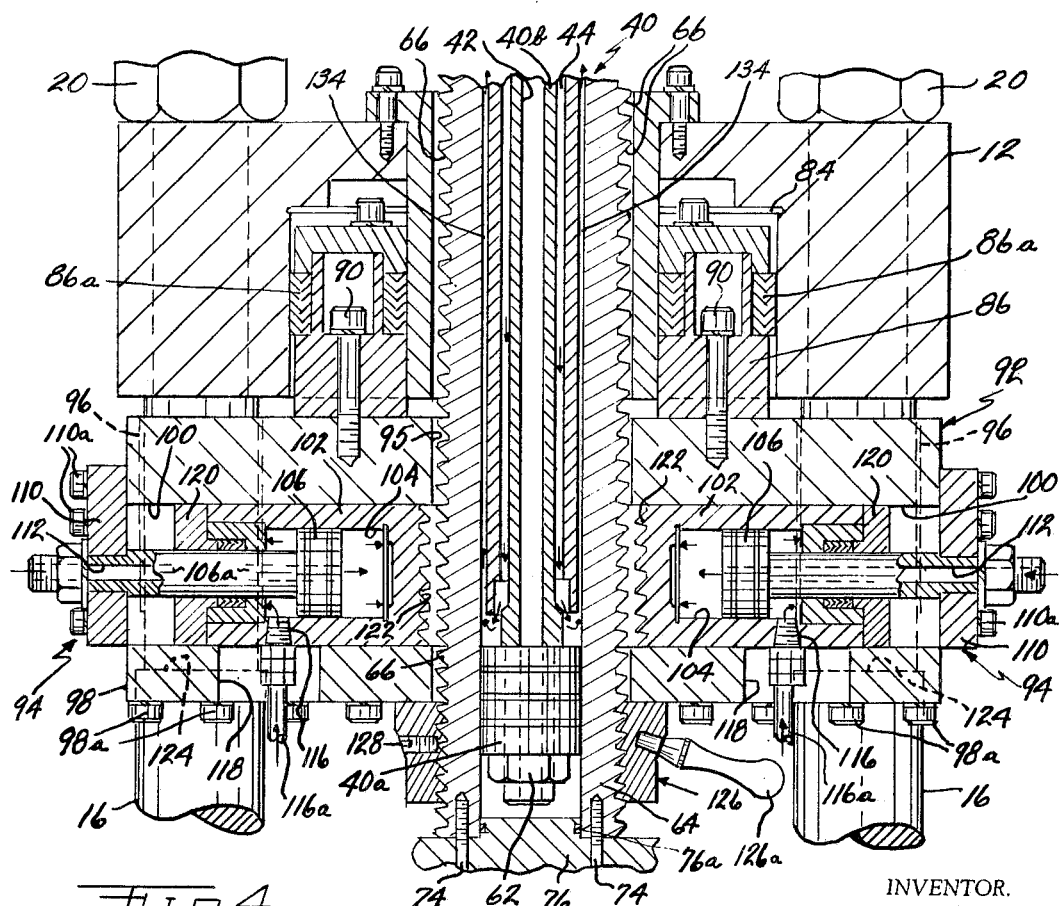
FIGURE 4 is a fragmentary sectional view taken generally along the plane of line 4—4 of FIG. 2A, looking in the direction of the arrows, and illustrating the laterally oriented clamping jaws and the actuating motor means therefor, adapted for coaction with the threaded cylinder of the primary motor unit; the clamping jaws in FIG. 4 are shown in retracted position.

Piston member 40a may be secured to rod 40b as by means of a threaded connection 62, and with the piston member 40a being disposed in relative sliding but sealing relationship in the cylinder member 64 of the primary actuating unit. Cylinder member 64 as best seen in FIGURES 2A and 4 is of elongated cylindrical configuration, with the exterior thereof serrated and in the embodiment shown such serrations comprising helical buttress threads 66 on the exterior of the cylinder member 64. A suitable arrangement of threads has been found to be 2 class 2A buttress threads per inch.

As can be seen from FIGS. 2A and 4, the threads or serrations extend for the full length of the cylinder member 64 and are adapted to be used in clamping the secondary actuating means to the lengthwise movable cylinder 64 of the primary actuating means, as will be hereinafter described. The outer end of the cylinder member 64 has an enlarged chamber section 68 therein, as best shown in FIGURE 2A, and there is provided packing or sealing means 70 disposed in chamber 68 and coacting between the cylinder member 64 and the aforementioned sleeve member 50 for sealing the end of the cylinder member. Packing means 70 is preferably removably held in chamber 68, and as by means of end plate 72. The other end of the cylinder member 64 is attached, as by means of fasteners 74 (FIGS. 2B and 4) to spacer plug 76 which has sealing means 76a (FIG. 2A) coacting therewith for sealing such other end of the cylinder member 64.

Spacer plug 76 may, in turn, be secured as by means of bolts 77 to a stripper plate support member 78 (FIG. 2B) which in turn is secured to the movable platen member 22 of the press as by means of bolts 80. Movable platen member 22 is mounted on aforementioned tie bars 16 which extend lengthwise of the machine base, and may have anti-friction bushings 82 for facilitating movement thereof with respect to the tie bars. In the embodiment illustrated there are four of such tie bars shown which mount the movable platen member.

Support member 12 may have a chamber 84 (FIG. 2A) formed therein in which is disposed for axial movement a piston 86. Piston 86 is of considerably larger size as compared to the piston 40a of the primary actuating means and has a packing assembly 86a attached thereto for sealing engagement with the confronting walls of the cylinder chamber 84 defined by member 12 and associated tubular sleeve 87 attached to member 12. Piston 86 and associated cylinder chamber 84 comprise the secondary actuating means for applying high pressure clamping force to the mold sections after the initial closing thereof. Such secondary actuating means may be of the single acting type and a port 88 (FIG. 1) may be provided communicating with chamber 84, for supplying pressurized fluid to and from chamber 84. Piston 86 of the secondary actuating means may be secured as by means of bolts 90 (FIG. 4) to a clamp supporting member 92.

Clamp supporting member 92 is movably mounted on the tie bar members 16 and is adapted to mount thereon clamping means 94, for clamping the piston 86 of the secondary actuating means to the axially movable cylinder 64 of the primary actuating means. As can be best seen in FIGS. 3 and 4, member 92 has a centrally located aperture 95 therethrough, through which extends the primary actuating unit 40. Member 92 may be provided with bushing means 96 of anti-friction material, coating with the tie bars 16 to facilitate axial movement of the clamp support 92 with respect to the tie bars.

Clamping means 94 may include laterally spaced bracket members 98, extending transversely of clamp support member 92 and secured thereto as by means of bolts 98a. As can be best seen in FIGURES 2A and 3, the clamp support member 92 has a slot 100 running transversely therethrough in which laterally spaced clamping jaws 102 (FIGS. 3 and 4) are adapted for movement toward and away from the primary actuating unit 40 extending axially therebetween. Each of the jaws 102, as can be best seen in FIGURES 3 and 4 comprise a cylindrical recess or chamber 104 therein defining a cylinder in which is disposed a piston 106 with a piston rod 106a attached thereto and extending outwardly of the cylindrical section to be anchored as at 108 to a support plate 110, which may be secured as by means of bolts 110a to support member 92. A passageway 112 is provide in piston rod 106a extending for the full length thereof and communicating with the chamber 104 on one end of piston 106 so that upon application of pressurized fluid to the passageway 112, and as by means of line 114 (FIG. 3), the pressurized fluid will cause movement of the associated jaw 102 in an inward direction away from the piston and toward the serrated cylinder 64 of the primary actuating unit 40. A port 116 may be provided in the wall of the associated jaw 102 communicating with chamber 104 on the outer end of the associated piston 106. A preferably flexible fluid pressure line 116a communicating with port 116 may be provided, and in this connection, each of the bracket members 98 may be provided with an elongated slot 118 therein (FIGS. 3 and 4) for providing for movement of the line 116a and associated jaw 102 with respect to the respective bracket member 98. A packing assembly 120 may be secured to the outer end of each jaw 102 for coacting with the associated piston rod 106a to maintain chamber 104 in the jaw leakage free. It will be seen that application of fluid pressure to port 116 via line 116a will cause outward movement of the respective jaw away from the cylinder 64 of the primary actuating unit. Stops may be provided to limit the outward movement of the jaws away from the primary actuating unit. However, it will be seen that in the embodiment illustrated, plates 110 limit the outward movement of the associated jaw.

The jaws 102 have serrations or a threaded configuration 122 on their inner ends formed complementary to the serrations or threaded configuration 66 of the cylinder member 64 of the primary actuating unit, and thus when the jaws are moved into coaction with the exterior of the cylinder 64, the jaws are strongly interlocked with the primary actuating unit, thus interlocking the secondary actuating unit including piston 86 thereof to the movable cylinder 64 of the primary actuating unit. Accordingly, when fluid pressure is introduced via port 88 into the chamber 84 of the secondary actuating unit, this will cause application of high pressure to piston 86 thereof in the outward direction of movement of the piston, and thus cause application of high pressure to the movable platen 22 in a direction toward the stationary platen 14, thus applying high pressure to the mold sections 24, 24a and preventing separation of the mold sections during injection of the moldable material therein. The tie rods 16 may be provided with shoulders 124 (FIGS. 2A and 4) thereon, adapted for limiting the maximum outward movement of piston 86 of the secondary actuating unit with respect to cylinder 84 thereof and the attached clamp support 92. The fluid pressure applied to the primary actuating unit may be of the order of 150 p.s.i., while the fluid pressure applied to the secondary actuating unit may be of the order of 3000 p.s.i.

Mounted on the cylinder 64 of the primary actuating unit 40 is a nut-like member 126 having a central aperture therethrough which is threaded complementary to the threads on the cylinder 64, and with such nut-like member 126 preferably having an actuating handle 126a, for turning the nut toward and away from the bracket members 98 secured to the clamp support 92. Nut 126 also preferably includes a set screw 128 for locking the position of the nut with respect to the threaded cylinder 64 of the primary actuating unit.

The primary purpose of the nut 126 is to initially provide for manual adjustment of the position of clamp support 92 and attached piston 86 of the secondary actuating unit, with respect to the threaded cylinder 64 of the primary actuating unit, so that the serrations or threaded configuration on the clamping jaws 102 mounted on clamp support 92, can be aligned with the serrations or threaded configuration 66 on the exterior of cylinder 64, thus insuring that interlocking coaction can expeditiously occur between the clamping jaws 102 and the threaded cylinder 64 upon predetermined actuation of the fluid powered motor units (i.e., 104, 106) associated with each of the clamping jaws.

Assuming that it is desired to set up the molding machine for molding operations on a mold, the mold sections of which have been secured to the platens 14 and 22 of the machine as shown for instance in FIG. 2B, the primary actuating unit 40 is actuated as by applying fluid pressure via line 129 (FIG. 1) to passageway 42 in the piston rod of the primary actuating unit, to thus move the movable platen 22 toward the stationary platen 14 and close the mold. During closure of the mold sections, the serrated or threaded cylinder 64 of the primary actuating unit moves with the movable platen 22, and thus cylinder 64, which extends as aforementioned between the clamping jaws 102, will be in a particular longitudinally extending position with respect to the jaws, when the mold sections 24, 24a are in closed condition.

The machine operator may then test the position of the threads 122 on the clamping jaws 102 with respect to the threads 66 on the cylinder 64 by applying light fluid pressure simultaneously to lines 114, to cause the jaws 102 to move inwardly toward the serrations 66 on the cylinder 64. If the threaded or serrated configurations of the jaws on this testing operation do not mate properly with the serrations or threaded configuration on the cylinder 64, then the machine operator by threadingly moving the nut member 126 on cylinder 64, can cause axial movement toward the left (as viewed in FIG. 1) of the clamp support member 92 and associated piston member 86 of the secondary actuating unit, with respect to the support 12, and thus properly align the threads on the clamping jaws 102 with the position of the threads on the primary actuating unit cylinder 64, so that upon full actuation of the fluid power motor units controlling the clamping action of the jaws 102, the threads on the jaws will properly mate with the threads on the cylinders 64. Due to the relatively large size of packing 86a of the piston 86 of the secondary actuating unit, the piston and attached clamp support member 92 may not be easily moved with respect to the mounting tie bars 16, but the adjusting nut 126 with its handle 126a provides for ease of movement of such piston and attached clamp support, and thus greatly expedites the longitudinal adjustment of the clamping jaws with respect to the cylinder 64.

It will be understood that other means instead of the aforediscussed trial and error method could be provided to ensure proper alignment of the threads on the jaws with respect to the threads on the cylinder 64. For instance a suitable gage could be provided for coaction between for instance stationary support 12 and movable clamp support 92 to measure the proper position of support 92 and attached piston 86 with regard to a predetermined size of mold.

Once the clamp member 92 is properly positioned so that the jaws are properly aligned with the serrations or threaded configuration on the cylinder 64 of the primary actuating unit, the nut 126 may be moved in a direction toward the right (with reference to FIG. 1) and a sufficient amount so that upon complete opening of the mold sections by movement of the cylinder 64 of the primary actuating unit toward the left (with reference to FIG. 2A) to its outermost position, the nut will just lightly engage or bump clamp support 92 and realign the position thereof to ensure that the threads on the clamping jaws are properly aligned with the threads on the cylinder 64 on the next cycle of the machine. Nut 126 in such forwardly disposed position may be secured in place as by means of the aforementioned set screw 126a, and ordinarily no other adjustment of the position of the piston 86 and attached clamp support 92 with respect to the cylinder 64 is necessary, unless or until the mold size is changed in the machine.

It will be seen that in the operation of the machine to mold articles, that the primary actuating unit 40 is actuated to close the mold sections and then the clamping jaws 102 are actuated so as to move inwardly into mating coaction with the serrated or threaded cylinder 64 of the primary actuating unit, after which high pressure hydraulic fluid is applied to the chamber 84 of the secondary actuating unit to subject the mold sections to high pressure and prevent flashing from occurring during injection of the moldable material by the injection mechanism 30 into the mold cavity. Mechanism 30 may be movable longitudinally of support 10 and toward and away from platen 14 in the conventional manner, and preferably is in injecting position prior to closing of the mold sections.

After injection of the moldable material is completed, the chamber 84 of the secondary actuating unit is decompressed, thus relieving the application of high pressure on the mold sections. Thereafter the clamping jaws 102 are deactuated by the application of fluid pressure to lines 116a, causing the jaws to move away from mating engagement with the serrations on the cylinder 64 of the primary actuating unit. Then the primary actuating unit can be deactuated by the application of fluid pressure to port 132 (FIG. 2A) of the manifold member 54, thus applying pressurized fluid to the space 134 (FIGS. 2A and 4) between the exterior of sleeve 50 and the interior of the cylinder 64, to cause movement of the cylinder 64 toward the left (with reference to FIG. 1)

thus separating the mold sections. Port 132 communicates with space 134 by the passageways defined by splines 44 on piston rod 40b. It will be understood that the nut 126 moves with the cylinder 64 and is so positioned as aforedescribed, that when the primary actuating unit 40 is actuated to fully open the mold sections, the nut 126 engaging clamp support 92 automatically realigns the clamping jaws with the threads on cylinder 64, for the next molding cycle. Accordingly, once the jaws 102 are manually aligned with the serrations on the cylinder 64 before commencing of the molding operations, no further manual adjustment of the position of the piston 86 and attached clamp support 92 is necessary during further molding operations.

After separation of the mold sections as is seen for instance in FIGURE 2B, stripper mechanism 136 may be actuated for pushing the molded article or articles from the mold section 24a. Stripper mechanism 136 may include stripper plate 138 mounted for reciprocal movement in a chamber 136a located in the movable platen 22, and with such plate having stripper members or fingers 140 secured thereto and which enter openings in mold section 24a for pushing the molded article or articles from the mold section upon opening of the mold. Stripper plate 138 may be connected to a fluid powered double acting motor unit 142 which may be comprised of the cylinder chamber 142a located in stripper plate support member 78 and the piston 142b and attached piston rod 142c. It will be seen that application of fluid pressure to port 144 will cause actuation of the stripper mechanism to force the molded articles from the mold section, and application of fluid pressure to port 146 will cause retraction of the stripper mechanism.

Once the machine has been set up as aforedescribed, the operation of the molding machine and actuation of the primary actuating unit, the secondary actuating unit, the motor units for actuating the clamping jaws and actuating the stripper plate, and the operation of the injection mechanism for injecting the moldable material into the mold cavity or cavities, are preferably all automatically actuated in a predetermined sequential manner for completely automatic operation of the machine. However, it will be understood that such operation may be manually controlled for manual operation by the machine operator.

From the foregoing discussion and accompanying drawings, it will be seen that the invention provides a novel molding machine which includes a primary actuating unit for the initial primary closing operation of the mold sections and a secondary actuating unit for obtaining high pressure closure of the mold members after completion of the primary closing, together with novel clamping means for clamping the secondary actuating unit to the primary actuating unit for accomplishing high pressure clamping of the mold sections, together with novel means for adjusting the position of the clamping means with respect to means on the primary actuating unit which are adapted for mating interlocking coaction with means on the clamping means.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:
1. In a holding machine comprising a support, a pair of spaced members mounted on said support, at least one of said members being movable and being adapted for closing and opening movements toward and away from the other of said members for clamping mold means therebetween, a first axially extensible and retractable fluid powered motor unit mounted on said support and coupled to said one member for providing the primary closing and opening movements of said one member, a second axially extensible and retractable fluid powered motor unit mounted on said support laterally of said first motor unit and adapted for providing secondary high pressure closing for said one member, and means adapted for coaction between said first and second motor units for clamping said second motor unit to said first motor unit for applying the force of said second motor unit to said one member.

2. In a molding machine comprising, a support, elongated tie bar means mounted on said support, a pair of spaced members on said support, at least one of said members being movably mounted on said tie bar means and being adapted for closing and opening movements toward and away from the other of said members for clamping mold means therebetween, a first axially extensible and retractable fluid powered motor unit mounted on said support and operatively coupled to said one member for providing the primary opening and closing movements of said one member, a second axially extensible and retractable fluid-powered motor unit mounted on said support laterally of said first motor unit and adapted for providing secondary high pressured closing for said one member, clamping means adapted for coaction between said first and second motor units for fixedly clamping said second motor unit to said first motor unit for applying the force of said second motor unit to said one member, said clamping means including a support portion mounted on said tie bar means and supporting movable clamping jaw means thereon, said clamping jaw means being adapted for clamping coaction with said first motor unit, said second motor unit comprising a piston portion and a cylinder portion, one of said piston and cylinder portions being fixedly coupled to said support and the other of said piston and cylinder portions being coupled to said support portion for movement of the latter therewith, and means adapted for coaction between said first and said second motor units for selectively adjusting the position of said other portion and coupled support portion with respect to said first motor unit and thus adjusting the position of said clamping jaw means with respect to said first motor unit prior to actuation of said clamping jaw means to clamp said motor units together.

3. A molding machine in accordance with claim 2, wherein said first motor unit comprises a serrated cylinder portion securd to said one member and being movwith said one member with respect to said support, and said clamping jaw means comprises laterally spaced movable serrated jaws on opposite sides of said first motor unit and adapted for coaction with said serrated portion of said first motor unit, for locking said motor units together.

4. A molding machine in accordance with claim 2 wherein said elongated tie bar means are mounted horizontally on said support and are coupled to said other of said members, said clamping jaw means being reciprocally mounted on said support portion, said piston and cylinder portions of said second motor unit encircling said first motor unit, said piston portion of said second motor unit being coupled to said support portion for movement of the latter therewith, and said cylinder portion of said second motor unit being fixed against axial movement relative to said support.

5. A molding machine in accordance with claim 4, including stop means on said tie bar means adapted for coaction with said support portion for limiting the travel of said piston portion of said second motor unit in the extending direction.

6. A molding machine in accordance with claim 2, including injection means mounted on said support and adapted for coaction with the first mentioned members for injecting moldable material into the mold means.

7. A molding machine in accordance with claim 2 wherein said clamping jaw means comprise laterally spaced movable jaws mounted on said support portion and fluid powered motor means operatively coupled to each of said jaws for actuating said jaws, said first motor unit comprising a cylinder portion movable axially relative to said support and extending through said support portion between said jaws, said second motor unit encircling said first motor unit in axially aligned relation therewith.

8. A molding machine in accordance with claim 7 wherein said jaws have means thereon adapted for high strength coupling to said first motor unit, the last mentioned means comprising serrations on said jaws adapted for mating coaction with serrations on said cylinder portion of said first motor unit.

9. A molding machine in accordance with claim 7 wherein said support portion comprises a block-like member having an axial opening therethrough through which extends said cylinder portion of said first motor unit and a transversely extending recess therethrough communicating with said opening and in which are disposed said clamping jaws, means securing said block-like member to said piston portion of said second motor unit each of said jaws defining a cylinder therein receiving a piston which is secured to said support portion with said cylinder and said piston defining said motor means, and means for supplying pressurized fluid to and from said cylinders of said motor means for causing movement of said jaws.

10. A molding machine in accordance with claim 2 wherein said position adjusting means comprises a force applying member mounted on said first motor unit and adapted for coaction therewith to apply an axially directed retracting force to said other portion of said second motor unit, said force applying member including means thereon for locking said force applying member in selected position on said first motor unit.

11. A molding machine in accordance with claim 2 wherein said support includes a base portion and a portion and a portion extending upwardly from said base portion, said second motor unit being a single acting motor unit disposed in axially aligned encircling relation to said first motor unit, said other portion of said second motor unit being disposed in said upwardly extending portion of said support and being rigidly attached to said support portion, said first motor unit comprising a double acting piston and cylinder motor unit with the piston portion thereof being stationarily mounted with respect to said support and the cylinder portion thereof being adapted for axial movement relative to the last mentioned piston portion and to said support, the last mentioned cylinder portion having a threaded configuration on the exterior thereof, said clamping jaw means including spaced clamping jaws disposed on opposite sides of said threaded cylinder portion, and said jaws each having a threaded configuration thereon adapted for mating coaction with the threaded cylinder portion upon clamping actuation of said clamping jaws, and said position adjusting means comprising a nut-like member mounted on said threaded cylinder portion of said first motor unit, means on said nut-like member for selectively rotating the latter to cause threading thereof on said threaded cylinder portion for applying an axially directed force to said support portion and coupled other portion of said second motor unit, so that the position of said clamping jaws can be adjusted with respect to said threaded cylinder portion for facilitating mating coaction between said clamping jaws and said threaded cylinder portion upon clamping actuation of said clamping jaws.

12. A molding machine in accordance with claim 2 including stripper mechanism coupled to one of said spaced members and adapted for coacting therewith for stripping molded articles from the mold means upon opening of the mold means.

13. A molding machine in accordance with claim 12 wherein said stripper mechanism comprises a stripper plate having stripper members secured thereto with said plate and associated stripper members being movable in a chamber formed in said one member, and a fluid powered motor unit coupled to said stripper plate for actuating the same.

14. A molding machine in accordance with claim 2 wherein said first motor unit comprises a reciprocal double acting piston and cylinder unit with the piston portion thereof being stationarily mounted with respect to said support and the cylinder portion thereof being adapted for axial movement relative to said support, the last mentioned cylinder portion having a threaded configuration on the exterior thereof and being secured to said one member for movement of the latter with said last mentioned cylinder portion, and said clamping jaw means including clamping jaws disposed on opposite sides of said threaded cylinder portion and adapted for mating coaction with the threaded cylinder portion upon clamping actuation of said clamping jaws, said second motor unit being disposed in axially aligned encircling relation to said first motor unit.

15. A molding machine in accordance with claim 11 wherein said tie bar means extends between said upwardly extending portion of said support and said other of said spaced members, said one member being slidably mounted on said tie bar means, said support portion being slidably mounted on said tie bar means, said threaded cylinder portion of said first motor unit being secured to said one member and upon predetermined actuation of said first motor unit being movable with said one member and with respect to said support, said support portion having a centrally located opening therethrough through which extends said threaded cylinder portion of said first motor unit.

16. A molding machine in accordance with claim 15 wherein said first motor unit is a relatively low pressure unit adapted to be subjected to a fluid pressure of approximately 150 p.s.i. and said second motor unit is a relatively high pressure unit adapted to be subjected to a fluid pressure of approximately 3000 p.s.i.

17. A molding machine in accordance with claim 15 wherein said support portion includes a transversely extending slot therein mounting said reciprocal jaws, retainer plate means secured to said support portion in confronting relation to said slot for retaining said jaws in said slot, each of said jaws defining a cylinder chamber therein, and a piston disposed in said cylinder chamber and being secured by a piston rod to said support portion, fluid transmission line means coupled to said cylinder chamber on opposite ends of said piston whereby the respective of said jaws can be moved toward and away from said threaded cylinder portion, and opening means in said retainer plate means through which extend certain of said transmission line means, said opening means being of sufficient size for full range of movement of the associated jaw.

18. A molding machine in accordance with claim 15 including injection means mounted on said support and adapted for coaction with said other member for injecting moldable material into the mold means, said injection means including an injection nozzle adapted to extend through said other member into coaction with the mold means for injecting moldable material into the mold means, and means for moving said injection means on said support and with respect to said other member.

19. A molding machine in accordance with claim 11 wherein said piston portion of said first motor unit is anchored to said upwardly extending portion of said support by a piston rod, the last mentioned piston rod having a fluid passageway extending completely therethrough for applying fluid pressure to one end of said piston portion of said first motor unit, said last mentioned rod having splines on the exterior thereof, a sleeve member encircling said last mentioned rod and defining in conjunction with said splines fluid passageway means for applying fluid pressure to the other end of said piston portion of said first motor unit, and manifold means coupled to said piston rod and providing an access port to the passageway means defined by said splines and said sleeve member.

References Cited

UNITED STATES PATENTS

| | | | |
|---|---|---|---|
| 2,689,978 | 9/1954 | Roger | 18—30 |
| 3,120,039 | 2/1964 | Stubbe et al. | 18—30 |
| 3,156,014 | 11/1964 | Wenger | 18—30 |
| 3,183,555 | 5/1965 | Siegel | 18—30 |

FOREIGN PATENTS 646,708  10/1962  Italy.

WILBUR L. McBAY, Primary Examiner

U.S Cl. X.R.

18—30; 164—341